United States Patent
Cole-Rhodes et al.

(10) Patent No.: US 11,005,540 B2
(45) Date of Patent: May 11, 2021

(54) METHOD AND SYSTEM FOR MULTIPLE INPUT, MULTIPLE OUTPUT COMMUNICATIONS IN MILLIMETER WAVE NETWORKS

(71) Applicant: Morgan State University, Baltimore, MD (US)

(72) Inventors: Arlene Cole-Rhodes, Bel Air, MD (US); Peter Taiwo, Abingdon, MD (US)

(73) Assignee: Morgan State University, Baltimore, MD (US)

( * ) Notice: Subject to any disclaimer, the term of this patent is extended or adjusted under 35 U.S.C. 154(b) by 0 days.

(21) Appl. No.: 16/923,177

(22) Filed: Jul. 8, 2020

(65) Prior Publication Data

US 2021/0013934 A1    Jan. 14, 2021

Related U.S. Application Data

(60) Provisional application No. 62/871,368, filed on Jul. 8, 2019, provisional application No. 62/871,376, filed on Jul. 8, 2019.

(51) Int. Cl.
| | |
|---|---|
| *H04B 7/0413* | (2017.01) |
| *H04B 7/0452* | (2017.01) |
| *H04B 7/06* | (2006.01) |
| *H04B 3/52* | (2006.01) |
| *H04L 25/03* | (2006.01) |
| *H04W 72/04* | (2009.01) |
| *H04B 3/54* | (2006.01) |

(52) U.S. Cl.
CPC ............. *H04B 7/0413* (2013.01); *H04B 3/52* (2013.01); *H04B 3/54* (2013.01); *H04B 7/0617* (2013.01); *H04L 25/0305* (2013.01); *H04W 72/042* (2013.01); *H04W 72/0413* (2013.01); *H04L 2025/03426* (2013.01)

(58) Field of Classification Search
CPC .......... H04B 7/0413; H04B 3/52; H04B 3/54; H04B 7/0617; H04L 25/0305; H04L 2025/03426; H04W 72/0413; H04W 72/042
See application file for complete search history.

(56) References Cited

U.S. PATENT DOCUMENTS

2017/0302426 A1\* 10/2017 Rainov ................ H04J 11/0026
2020/0021342 A1\*  1/2020 Ge ....................... H04B 7/0456

\* cited by examiner

*Primary Examiner* — David S Huang
(74) *Attorney, Agent, or Firm* — Whiteford, Taylor & Preston, LLP; Gregory M. Stone

(57) ABSTRACT

Disclosed herein are methods and systems for processing signals from multiple users at an antenna array, and to provide beamforming for transmitting to those multiple users, and more particularly for channel estimation and wireless signal recovery in wireless networks carrying transmissions in the millimeter wave frequency bands to enable such beamforming. Such methods and systems enable MIMO communications at millimeter wave frequencies for multiple users communicating with a MIMO antenna system, such as a massive MIMO multi-antenna system (multi-antenna arrays that consist of hundreds of antenna elements). Such methods and systems may characterize the communications link (i.e., channel) at that frequency band, and directly provide a precoding matrix for beam steering towards a particular user that is in communication with the antenna system.

20 Claims, 6 Drawing Sheets

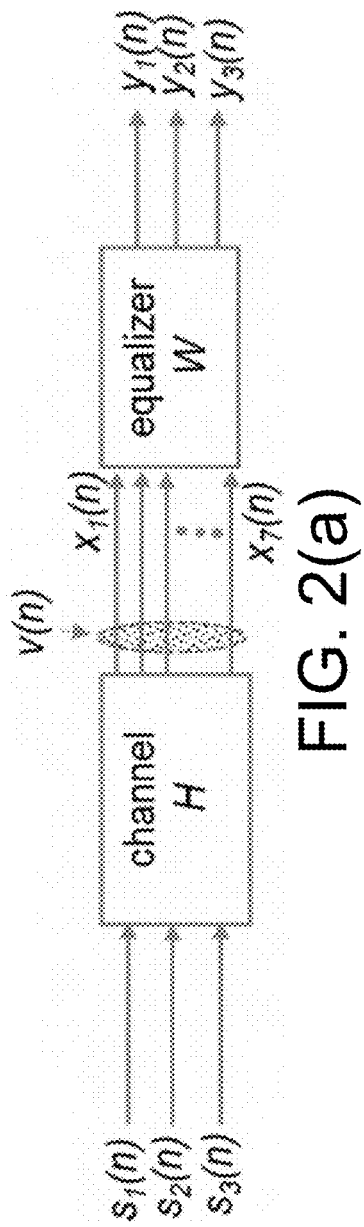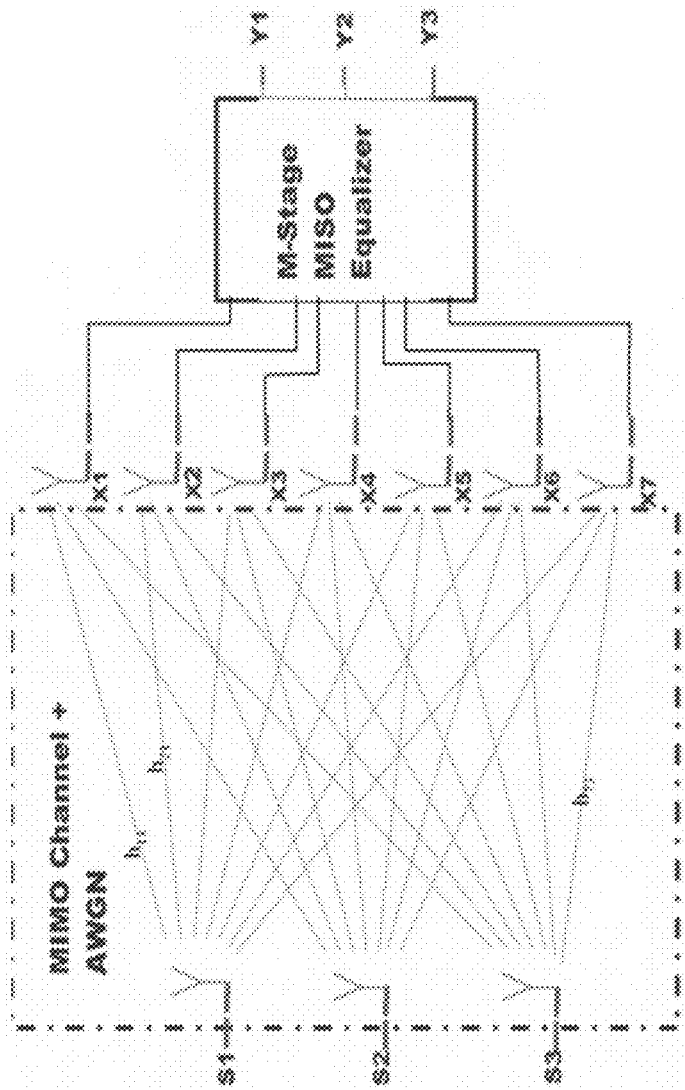
FIG. 2(a)
FIG. 2(b)

METHOD AND SYSTEM FOR MULTIPLE INPUT, MULTIPLE OUTPUT COMMUNICATIONS IN MILLIMETER WAVE NETWORKS

CROSS REFERENCE TO RELATED APPLICATIONS

This application is based upon and claims the benefit of U.S. Provisional Application No. 62/871,376 titled "Real-Time Data-Aided Blind Equalizer," filed with the United States Patent & Trademark Office by the inventors herein on Jul. 8, 2019, and of U.S. Provisional Application No. 62/871,368 titled "Mobile Multi-User MIMO Communications for Millimeter-Wave Networks," filed with the United States Patent & Trademark Office by the inventors herein on Jul. 8, 2019, the specifications of which are incorporated herein by reference in their entireties.

GOVERNMENT RIGHTS

Portions of the invention described herein were made with government support under Contract Number DA AD19-01-2-001 awarded by the United States Army Research Laboratory. The U.S. government may have certain rights in the invention.

FIELD OF THE INVENTION

This invention relates generally to processing of wireless communications, and more particularly to methods and systems for channel estimation and wireless signal recovery in wireless networks carrying transmissions in the millimeter wave frequency bands.

BACKGROUND OF THE INVENTION

With the volume of global mobile data traffic growing exponentially from year to year due to an increase in use of mobile devices across different wireless platforms, there has been a continually increasing demand for better wireless network coverage and throughput to accommodate multiple end-user connectivity and faster data transfer requests. Indoor mobile data traffic has been a large contributor to this surge in the demand for higher data rates on wireless networks. Thus, a wireless strategy that ensures robust indoor wireless coverage and increased throughput capacity is essential for addressing these challenges. Support for wireless services inside buildings (where concrete walls and glass can potentially block radio signals) is not just about providing reliable coverage, but it also involves expanding capacity to user equipment in terms of the bandwidth and providing direct access to higher data rates by the end users. With the advent of the internet-of-things (IoT), technology which is capable of adding billions of wirelessly connected devices within the walls of our homes and offices to existing communication networks, as well as high end smartphones and other mobile devices that provide the ease of access to data-hungry applications such as social media apps, virtual reality and artificial intelligence apps, video streaming, video conferencing and voice over IP (VOIP) services, it is imperative to ensure that users have enough capacity to ensure a seamless user experience while utilizing these services. Even further, even the once primarily wired desktop computer devices, both at home and for business use, now come equipped with wireless interface cards to wirelessly connect to local area networks.

A promising solution for future network expansion lies in developing communication systems that can operate within the millimeter wave (mm-wave) frequency spectrum, which lies between 30 and 300 GHz. This can provide orders of magnitude greater bandwidths than current technology, as well as further gains via beamforming and spatial multiplexing from multi-element antenna arrays. Because millimeter wave transmission can achieve much greater directionality than the microwave frequencies, there is much greater opportunity for indoor wireless devices to simultaneously communicate with an access point using spatial division multiple access techniques. In addition, the access point or base station can use spatial filtering and phased array beam-steering to receive and transmit data respectively for multiple devices.

The millimeter wave spectrum has wavelengths of 1-10 millimeters, and these bands are especially useful for high-speed, short range, line-of-sight communications applications. The use of this band in massive multiple-input multiple-output (MIMO) wireless communication enables the possibility of deploying a large number of miniaturized antennas which can be packed into a small space, due to the characteristic short wavelength in this spectrum range. This can in turn open up ways to achieve the requirements and expectations of future wireless communication systems, which is required to massively increase data rates and to be able to handle a greater number of connected devices with very low round-trip latency and optimal energy efficiency.

As these radio signals propagate through the atmosphere, absorption or scattering causes attenuation of the signals, and this is a function of the length of the radio link. At mm-wave, the channel models are different because the propagation environment has a different effect on signals with a much smaller wavelength, and there are strong differences between line-of-sight (LOS) and non-LOS propagation conditions. The scattering is higher due to the increased effective roughness of materials, and penetration losses can be much larger. The channel models use some of the same properties as lower (microwave) frequency systems, such as multi-path delay spread, angle spread, and Doppler shift, but with different parameters. In addition, mm-wave frequencies are very vulnerable to blockage caused by some building materials and the human body, and such blockage can severely attenuate or reflect these radio waves. Attenuation dictates how much of the transmitted signal is actually received through the channel.

For outdoor communication, atmospheric absorption restricts the range of these millimeter waves, since rain, fog, and any moisture in the air can make the signal attenuation very high. Thus, millimeter wave transmission is much more suitable for the indoor environment and its short range and directionality can, in fact, be a benefit as this can cut down on interference from other wireless devices within the indoor space.

While the benefits offered by transmitting wireless communications in the millimeter band frequencies are significant, challenges remain in providing wireless base stations with the processing capabilities necessary to effectively manage transmissions, as indoor wireless networks continue to expand in size and complexity. Moreover, the ability to capture and determine channel state information in real time for such millimeter frequency transmissions, a process that as yet has not been successfully implemented, is key to being able to provide improved wireless communications architectures in this frequency band.

SUMMARY OF THE INVENTION

Disclosed herein are methods and systems for processing signals from multiple users at an antenna array, and to provide beamforming for transmitting to those multiple users, and more particularly for channel estimation and wireless signal recovery in wireless networks carrying transmissions in the millimeter wave frequency bands to enable such beamforming, as may be encountered in (by away of non-limiting example) indoor wireless networks. In order for a beam of data to be successfully directed to a user in such an environment, the channel state information must be estimated. In accordance with certain aspects of an embodiment of the invention, an alphabet-matched algorithm (AMA) coupled with a constant modulus algorithm (CMA) may be employed, which are blind adaptive algorithms to achieve the uplink communication. This channel state information can then be used as a precoder for beamforming in the downlink communications of the multi-user system.

The channel is characterized by the type of antenna array in use. A uniform linear array (ULA) antenna may be described having N equally-spaced elements placed along an axis having an incident beam, inclined at a physical angle θ' to the perpendicular axis cutting through the antenna array. The beam steering vector a(θ) for the downlink channel towards a single user is defined as a function of the electrical angle θ of the uplink incident beam from that user:

$$a(\theta) = [1, e^{-j\theta}, e^{-j2\theta}, \ldots, e^{-j\theta(N-1)}]^T$$

where $$\theta = \left(\frac{2d}{\lambda}\right)\pi\sin\theta'$$

and θ'=Physical angle and θ=Electrical angle, and λ and d are the carrier wavelength and the ULA antenna spacing, respectively. For an optimally constructive beam to be achieved, where the distance between a user and the base station is much larger than the size of the antenna, the antenna spacing d may be chosen to be half the wavelength of the transmit frequency (i.e., d=λ/2).

When the channel estimation is performed during the uplink transmission, a blind multiuser equalization process is employed, which eliminates the use of training signals, and thus circumvents the issue of pilot contamination. This helps in resolving the problem of pilot contamination that were experienced in previously attempted channel estimation methods. A blind adaptive block equalization process is applied (as discussed in detail below), which processes the data by relying on the knowledge of signal structure and its statistics. In an experimental configuration, a signal was transmitted using 16-QAM modulation. There is no training sequence involved, although one known symbol should be included within every transmitted signal block to unambiguously resolve the received signal. This is a small cost when large signal blocks are used, which causes very little wastage or loss in bandwidth during transmission. Fast Fourier Transform (FFT) may be used to increase the processing speed of the block adaptive process required to reach convergence.

Methods and systems employed in accordance with at least certain aspects of the invention enable multiple-input, multiple-output (MIMO) communications at millimeter wave frequencies for multiple users communicating with a multi-antenna system, such as a massive MIMO antenna array system (a multi-antenna array that consists of hundreds of antenna elements). Such methods and systems may characterize the communications link (i.e., channel) at that frequency band, and directly provide a precoding matrix for beam steering towards a particular user that is in communication with the antenna system.

The MIMO operation of a multiple transmitter and receiver communications network in accordance with aspects of the invention may be simulated in software to explore the use of beam-steering for communications between a base-station equipped with a massive MIMO antenna array and multiple users each equipped with a single antenna or multiple antennae (under various configurations). One key question concerning the use of mm-wave frequencies, and in general about 5G cellular systems, is what type of modulation is to be used at these frequencies. The propagation attenuation of mm-wave frequencies makes this a viable technology mainly for small-cell, dense networks, where few users will be associated with any given base station, such that it is up for debate whether to exploit the efficient frequency-multiplexing features of OFDM, since users may also be multiplexed in the time domain as efficiently as in the frequency domain. For channel estimation, one may deploy a Fast Fourier Transform (FFT)-based sparse matrix method and use null cyclic prefix single carrier (NCPSC) modulation signaling such as BPSK and QPSK modulation. Multi-user access can be achieved by the use of a time-division operation, rather than a frequency division operation, which allows us to consider multiple single-stream transmissions between multiple antennas in the MIMO communication setup. For a dense network of users, a model depicts a communications network consisting of multiple users based on the use of massive MIMO operating between macrocells and picocells; together with algorithms for power efficient communications, such as non-orthogonal multiple access (NOMA) with successive interference cancellation and one-bit quantization at the receiver.

Single carrier schemes have been proposed for millimeter-wave wireless MIMO, and when using single carrier modulation, a block processing blind equalization scheme may present an alternate approach to signal recovery at the receiver. The channel state information (CSI) may then be acquired implicitly during the equalization process, with little or no training overhead.

Equalization based on a multiple antenna MIMO system as described herein may achieve more spectrally efficient communications. The associated channel path is estimated, which may then be used to remove the captured signal from the received data mixture in an approach similar to the widely used interference cancellation techniques. All of the transmitted signals are finally recovered using this equalizer, which accepts multiple input blocks of data and it produces as output, the strongest signal present in the received data mixture. The signals are recovered in a multi-stage approach, with the number of stages equal to the number of signals transmitted. Such processes may be made more computationally efficient by performing the signal-processing computations in the frequency domain, and this implementation aids the real-time processing of the received data blocks. This process may be extended to apply to massive MIMO systems operating at millimeter wave frequencies.

In accordance with certain aspects of the invention, a method for processing wireless signals received from multiple users at an antenna array is provided, comprising the steps of: providing a base station equipped with a phased array antenna system; receiving at the phased array antenna system a plurality of wireless uplink transmissions in a millimeter frequency band of 30 GHz-300 GHz, each wireless uplink transmission being received through a distinct wireless communications channel from a distinct wireless transmitter; applying adaptive, block processing blind channel equalization to generate channel state information by providing an estimate of a channel path for each one of the wireless communications channels, and to separate out and recover individual wireless uplink transmissions from the plurality of wireless uplink transmissions; and generating a zero-forcing precoding matrix to beamform a downlink signal toward a transmitter of one of the wireless uplink transmissions through a corresponding channel between the transmitter and the base station based on the estimated channel state information of the corresponding channel.

In accordance with further aspects of the invention, a system for processing wireless signals received from multiple users at an antenna array is provided, comprising a base station equipped with a phased array antenna system, one or more processors, and one or more memories coupled to the one or more processors; wherein the one or more memories are configured to provide the one or more processors with instructions which when executed cause the one or more processors to: receive at the phased array antenna system a plurality of wireless uplink transmissions in a millimeter frequency band of 30 GHz-300 GHz, each wireless uplink transmission being received through a distinct wireless communications channel from a distinct wireless transmitter; apply adaptive, block processing blind channel equalization to generate channel state information by providing an estimate of a channel path for each one of the wireless communications channels, and to separate out and recover individual wireless uplink transmissions from the plurality of wireless uplink transmissions; and generate a zero-forcing precoding matrix to beamform a downlink signal toward a transmitter of one of the wireless uplink transmissions through a corresponding channel between the transmitter and the base station based on the estimated channel state information of the corresponding channel.

BRIEF DESCRIPTION OF THE DRAWINGS

The numerous advantages of the present invention may be better understood by those skilled in the art by reference to the accompanying drawings in which:

FIG. 2(a) is a schematic view of a MIMO equalizer system in accordance with further aspects of an embodiment of the invention.

FIG. 2(b) is a schematic view of the channels for the MIMO equalizer system of FIG. 2(a).

DETAILED DESCRIPTION

Figure 1:
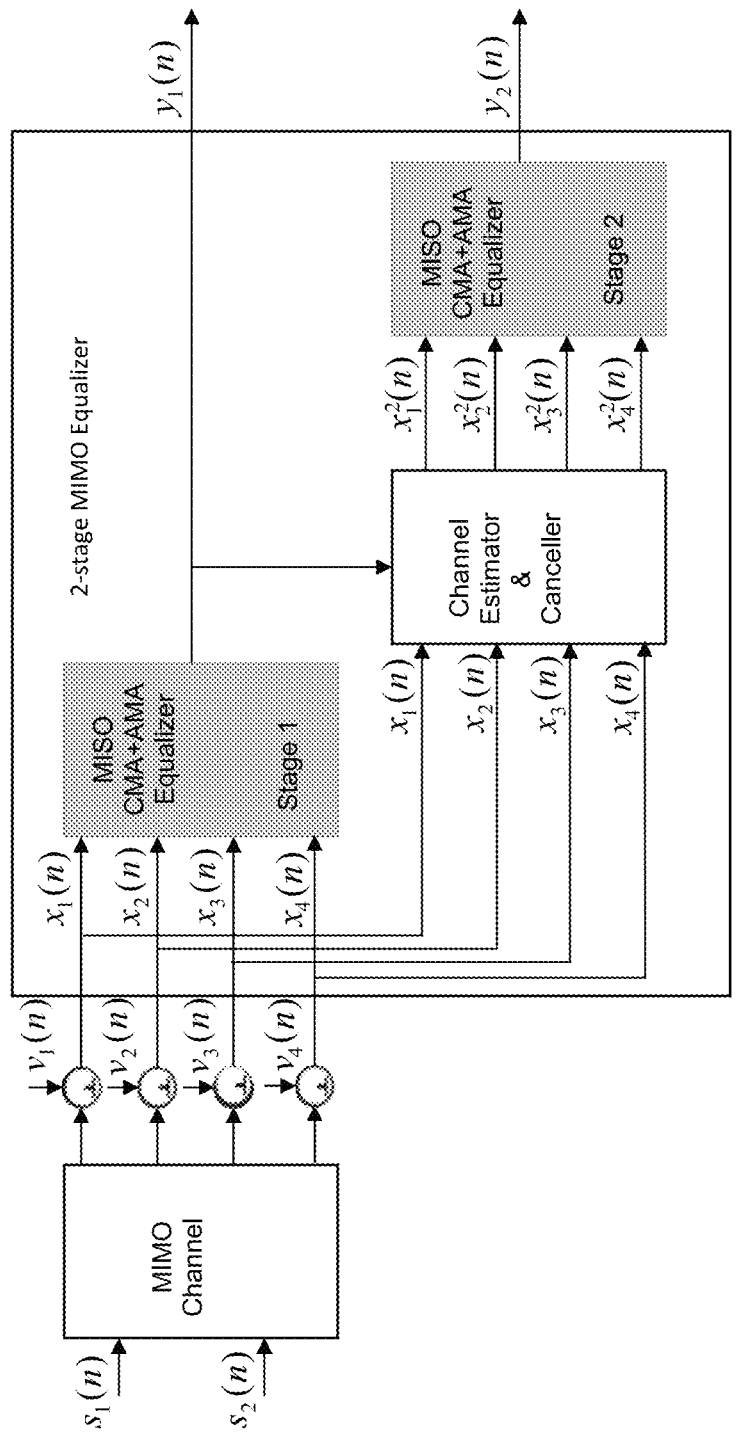
FIG. 1 is a schematic view of a MIMO equalizer system in accordance with certain aspects of an embodiment

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

As mentioned above in the Summary of the Invention, in order for a beam of data to be successfully directed to a user from an antenna array in a communications environment operating in the millimeter frequency band as described herein, the channel state information must first be estimated, which channel estimation is determined by a blind equalization process that ultimately separates transmitted signals from the received noisy data mixture at the base station that comprises the antenna array. As used herein, "base station" is intended to describe both a physical base station receiving wireless transmissions from disparate, physical wireless transmitters, which in turn may beamform a return, downlink signal to each of those wireless transmitters, and to a software-implemented simulated base station that may be used to simulate reception and processing of wireless transmissions from disparate, simulated wireless transmitters for purposes of further defining channel models for wireless transmissions, wherein all of such wireless transmissions are in the millimeter wave frequency bands covering the range of 30 GHz-300 GHz, and more particularly covering the range of 92 GHz-95 GHz.

To separate transmitted signals from the received noisy data mixture at the base station without use of training signals, a blind equalizer is employed. Blind equalizers achieve equalization of the received signals by using only the statistics of the transmitted signals. The Constant Modulus Algorithm (CMA) is the most popular method used for blind equalizers. In a particular configuration, systems and methods accordance to certain aspects of the invention employ a MIMO equalizer that is an extension of a previously implemented single-input/single output CMA+AMA equalizer, which is described in A. Beasley, A. Cole-Rhodes, "Blind Adaptive Equalization for QAM Signals using an Alphabet-Matched Algorithm," IEEE GLOBECOM, November 2006, which publication is incorporated herein by reference in its entirety. The CMA+AMA equalizer extends the performance analysis and evaluation processes set forth in F. Moazzami and A. Cole-Rhodes, "An Adaptive Blind Equalizer with signal separation for a MIMO transmitting QAM signals," IEEE MILCOM, 2008, which publication is likewise incorporated herein by reference in its entirety.

FIG. 1 is a schematic view of a MIMO equalizer system in accordance with certain aspects of an embodiment, where $s_i(n)$ is the transmitted data block, $v_i(n)$ is additive noise, $x_i(n)$ is the received data block, and $y_i(n)$ is the equalizer output. Fundamentally, an equalizer (and more particular a multiple input/single output (MISO) CMA+AMA equalizer as described in further detail below) produces a single signal, and it is based on the number of input signals that it processes. Any number of inputs greater than one is considered a multi-input system. This process may be enabled using a matrix formulation of the problem to develop the equalizer, as detailed below.

CMA has been widely and successfully used for the equalization of a wireless MIMO channel. It is especially effective when the transmission modulation scheme is one which lies on a constant radius, such as QPSK, and because CMA is phase blind it always requires that the correct phase is resolved. CMA has also been shown to work for signals, such as 16-QAM, which are not constant modulus but for these cases it leaves a high residual ISI. Note that the 16-QAM signal constellation has a property of multiple constant radii, together with a rectangular orientation of the signal constellation, such that an additional equalizer is preferably used in the form of AMA, to enhance the CMA.

FIG. 2(a) provides a schematic view of a MIMO equalizer system in accordance with further aspects of an embodiment of the invention, and it is based in this exemplary case on three transmit antennas transmitting three independent signal blocks and seven receive antennas at the base station. In this exemplary case, the transmitted signal blocks are wide-sense stationary (WSS), and the received signal blocks are likewise wide-sense stationary, and the equalizer is expected to recover the three transmitted signals using a multi-stage process in three stages (as determined by the number of input signals).

Thus, for $1 \leq j \leq 7$, the received signal is determined as follows:

$$x_j(n) = \Sigma_{i=1}^{3}(h_{ji}(n)*s_i(n)) + v_j(n) \quad (1)$$

where * is the convolution operator, $x_j(n) \in \mathbb{C}^N$ is the received data block of size N, $s_i(n) \in \mathbb{C}^N$ is the transmitted data block of size N, $h_{ji}(n) \in \mathbb{C}^K$ is the K-tapped channel path between the transmit signal, $s_i(n)$ to the receive signal, $x_j(n)$ as shown in FIG. 2(b), and $v_j(n)$ is additive white Gaussian noise (AWGN).

A multiple-input/single-output (MISO) equalizer is used at each stage of the equalization process. For $1 \leq i \leq 3$, the equalizer output, $y_i$ at stage i, is obtained using the convolution operation below:

$$y_i = \Sigma_{j=1}^{7}(w_{ij}(n)*x_j(n))) \quad (2)$$

where for $1 \leq j \leq 7$ (with fixed i), $w_{ij}(n) \in \mathbb{C}^L$ is an equalizer filter of L taps. If we choose to write the channel as a matrix with elements as defined in FIG. 2(b), then we can define a matrix convolution operator ' $\text{Ж}$ ' by rules similar to those of matrix multiplication as follows:

$$\begin{bmatrix} a(n) & b(n) \\ c(n) & d(n) \\ e(n) & f(n) \end{bmatrix} \text{Ж} \begin{bmatrix} g(n) \\ h(n) \end{bmatrix} = \begin{bmatrix} a*g + b*h \\ c*g + d*h \\ e*g + f*h \end{bmatrix} \quad (3)$$

where for example, a*g is the usual convolution operation between signals, a(n) and g(n). Then we can re-write (1), the set of equations for the MIMO channel, more compactly using the convolution operator defined in (3), by:

$$\begin{bmatrix} x_1 \\ x_2 \\ \vdots \\ x_7 \end{bmatrix} = \begin{bmatrix} h_{11} & h_{12} & h_{13} \\ h_{21} & h_{22} & h_{23} \\ \vdots & \vdots & \vdots \\ h_{71} & h_{72} & h_{73} \end{bmatrix} \text{Ж} \begin{bmatrix} s_1 \\ s_2 \\ s_3 \end{bmatrix} + \begin{bmatrix} v_1 \\ v_2 \\ \vdots \\ v_7 \end{bmatrix} \quad (4)$$

where each of the (bold) signals $x_i \in \mathbb{C}^N$, $s_i \in \mathbb{C}^N$, $h_{ji} \in \mathbb{C}^K$ are multi-tapped, with the time variable (n) suppressed in each case. Note that $s_i$ is the 16-QAM signal block of length, N transmitted by antenna i. Thus the MIMO channel, H is a tensor where the matrix H(k) is the channel component at time-tap, k.

Similarly, if each channel path between the transmit and receive antenna is of length K taps, then we can re-write (4) alternatively as $$\underline{x}(n) = \Sigma_{k=0}^{K-1}(H(k)\underline{s}(n-k)) + \underline{v}(n) \quad (5)$$

where we have specified the matrix $$H(k) = \begin{bmatrix} h_{11}(k) & h_{12}(k) & h_{13}(k) \\ h_{21}(k) & h_{22}(k) & h_{23}(k) \\ \vdots & \vdots & \vdots \\ h_{71}(k) & h_{72}(k) & h_{73}(k) \end{bmatrix}$$

to be the $k^{th}$ tap of the channel tensor H defined in (4), and $$\underline{s}(n) = \begin{bmatrix} s_1(n) \\ s_2(n) \\ s_3(n) \end{bmatrix}$$

is the vector of transmitted signal blocks at time n. Note similar definitions for vectors, $\underline{x}(n)$ and $\underline{v}(n)$ in (5).

As mentioned above, adaptive blind equalizers are applied in the foregoing MIMO communication system model. The constant modulus algorithm (CMA) is an adaptive blind equalizer which is very widely used because of its simplicity, good performance and its robustness. CMA is phase blind, and so the phase correction must always be resolved at the end of the process. The CMA filter coefficients are updated iteratively using the statistics of the transmitted signal, until the equalizer converges and the cost function is minimized.

The cost function for the CMA is given by $$J_{CMA}(y) = E\{(|y(n)|^2 - R_2)^2\} \quad (6)$$

where $R_2$ is the signal statistic computed as $$R_2 = \frac{E\{|c(i)|^4\}}{E\{|c(i)|^2\}},$$

and c(i) for i=1, 2, ... M are the known (16-QAM) constellation points, with M=16 in this case.

Likewise, the cost function for the AMA is given by $$J_{AMA}(y) = E\left\{1 - \sum_{i=1}^{M} e^{-\frac{|y(n)-c(i)|^2}{2\sigma_{AMA}^2}}\right\} \quad (7)$$

where $\sigma_{AMA}$ is the constant parameter which specifies the width of the nulls around each 16-QAM constellation point, and y(n) is the equalizer output. AMA is a blind equalization scheme that exploits the knowledge of the known constellation alphabet, and it takes into consideration both the amplitude and phase of the signal. It computes a measure of the distance of each equalized output from each of the constellation points and restores the shape of constellation by minimizing this distance. It is more suitable than CMA for modulation schemes, such as 16-QAM and it can recover the constellation to the nearest quadrant position (i.e. to within a multiple 90 degrees). It does require good initialization in order to be effective.

Figure 3:
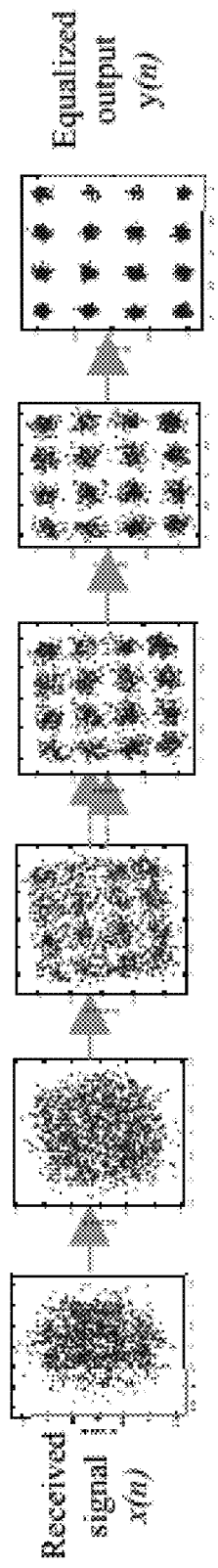
FIG. 3 is a graphical representation of single stage MISO equalization process to recover 16-QAM signal in accordance with certain aspects of an embodiment of the invention.

A new cost function may thus be defined as the sum of the CMA and AMA equalizers, and due to the global convergence property of the CMA equalizer the initial updates for this equalizer will depend mainly on CMA. This will allow CMA to provide the required initialization for the AMA equalizer to effectively take over. The cost function used for CMA+AMA as set forth herein is given by $$J(y) = J_{CMA}(y) + J_{AMA}(y) \quad (8)$$

where the individual cost functions are given by (6) and (7). Equalization is achieved by updating the filter coefficients of the equalizer iteratively, starting with a center-tap initialized filter. The filter coefficients are updated using a steepest descent until convergence to a set of final equalizer weights, which will minimize the specified cost function. This final weight vector determines the equalized output as shown in FIG. 3. The steepest descent rule is given by $$w_{k+1} = w_k - \mu_k \nabla J_k(y) \quad (9)$$

where $w_k$ is the L-tapped equalizer weight vector, $\nabla J_k(y)$ is the gradient of the cost function, and $\mu_k$ is the adaptive step size, at iteration k.

With Block Processing, the adaptive step size is computed using the received data block, x as follows:

$$\mu_k = \beta \|x^H w_k\| / \|x^H \nabla J_k(y)\|$$

and $(.)^H$ is the Hermitian operator, and scaling factor, $\beta$. Note that the gradient of the CMA+AMA cost is computed using the gradients of the separate CMA and the AMA cost functions, and $\nabla J(y)$ is given by $$\nabla J(y) = \nabla J_{CMA}(y) + \nabla J_{AMA}(y). \quad (10)$$

Since we are using a block processing approach, at each iteration the equalizer will be updated using an average gradient that is computed over all the samples in the equalized data block, y(n). This achieves equalizer convergence, which is much more robust and smoother than in the case of serial processing.

Since we are using block processing, the gradients of each cost function with respect to the weight vector, $\underline{w}$ are given by $$\nabla J_{CMA}(y) = E\{4(|y(n)|^2 - R_2)y(n)\}(XX)^H \quad (11)$$

and $$\nabla J_{AMA} = E\left\{\sum_{i=1}^{M} \frac{1}{\sigma_{AMA}^2} e^{-\frac{|y(n)-c(i)|^2}{2\sigma_{AMA}^2}} (y(n) - c(i))\right\}(XX)^H \quad (12)$$

where $[XX]=[XX_1\ XX_2\ ...\ XX_7]$ for the MISO equalizer of seven (7) inputs, with $XX_j \in \mathbb{C}^{(L+N-1)\times L}$ defined as the Toeplitx matrix of the received signal block, $\underline{x}_j(n)$ of length N, each of which is given by $$XX_{(SISO)} = \begin{bmatrix} x(1) & 0 & \ldots & 0 & 0 \\ x(2) & x(1) & \ldots & \vdots & \vdots \\ x(3) & x(2) & \ldots & 0 & 0 \\ \vdots & x(3) & \ldots & 0 & 0 \\ \vdots & \vdots & \vdots & x(1) & 0 \\ x(L) & \ldots & \ldots & x(2) & x(1) \\ \vdots & \vdots & \vdots & \vdots & \vdots \\ x(N-1) & \ldots & \ldots & x(N-L+1) & x(N-L) \\ x(N) & x(N-1) & \vdots & \vdots & x(N-L+1) \\ 0 & x(N) & \ldots & x(N-2) & \vdots \\ 0 & 0 & \ldots & x(N-1) & x(N-2) \\ \vdots & \vdots & \vdots & x(N) & x(N-1) \\ 0 & 0 & 0 & \ldots & x(N) \end{bmatrix}$$

and $(XX)^H$ is its Hermitian, i.e. complex conjugate transpose operation. Note that for a single-input/single-output (SISO) system with equalizer specified by $w_{i1} \in \mathbb{C}^L$, the equalized signal block, $y \in \mathbb{C}^{N+L-1}$ can be written as $$\begin{bmatrix} y(1) \\ y(2) \\ y(3) \\ \vdots \\ y(N+L-1) \end{bmatrix} = XX_{(SISO)} \begin{bmatrix} w_{i1}(0) \\ w_{i1}(1) \\ w_{i1}(2) \\ \vdots \\ w_{i1}(L-1) \end{bmatrix}$$

FIG. 3 shows the equalizer output over multiple iterations using this block processing CMA+AMA equalization, during which the transmitted 16-QAM signal block is recovered. At each iteration, as the equalizer weight vector is updated it produces the specific output as shown.

In the general case of an M-input/P-output channel, where P≥M, an M-Stage multiple-input/single-output (MISO) equalizer has been developed, and it is used to equalize and capture a single signal block at every stage. For M=3 and 1≤i≤3, each stage i will yield a final equalizer output signal, $y_i(n)$, which is one of the transmitted signals, $s_j(n)$. Thus the update process shown in FIG. 3 will occur at each stage of the CMA+AMA equalization process based on the developed MISO equalizer, which has as its input a (modified) version of the received signal, $x_p(n)$.

After convergence of the equalizer at this stage, the final weight vector w(n) and the equalized output y(n) are obtained using (2). This weight vector is then used to estimate the impulse response of the channel $h_j(n)$ over which the captured signal $s_j(n)$ was transmitted. This together with the recovered signal and the equalizer input are used by the signal canceller to remove the contribution of the recovered signal from the equalizer input signal. Thus, we obtain the input to the MISO equalizer for the next stage, which is a (modified) version of the received signal block. Note that at the first stage, the input to the MISO equalizer is simply the full data block received at the antenna.

The input source to the MISO equalizer at any stage i+1 is obtained by cancelling out the captured signal from the equalizer input of the previous stage i. This result is then fed into the next stage of the equalization process as the input signal, $x^{i+1}(n)$. It is a modified version of the received data block obtained from the signal canceller, after applying the results of the channel estimator to the current signal block, $x^i(n)$ as described below.

The length, L of the equalizer is chosen to be three (M) times K (the length of the channel), and for M input signals we require that L≥MK−1. So once the equalizer has converged and a signal has been recovered at a particular stage, the estimated K-tapped channel which is computed at this stage will be embedded within an extended length filter of the size of the equalizer, L (>K), while the remaining L−K taps should be zero. Now the estimate of the K-tapped channel over which the data block was transmitted can be determined by the following expression:

$$h_{est}(n) = (1/\sigma_y)^2 R_{XX}(K-1)\underline{w}(n) \quad (13)$$

where $\underline{w}(n)$ is the final weight vector for the current stage of the equalizer. For a channel of length K, $R_{XX}(K-1)$ is the autocorrelation matrix of the $(K-1)^{th}$ lag of the received data block, x(n), which is assumed to be WSS. Note that the matrix $R_{XX}(K-1)$ is computed directly from the received data, and $\sigma_y^2$ is the variance of the equalized output, y(n).

Next, the signal canceller process is applied. Suppose that at the current stage i, the equalized signal, $y_i(n)$ recovers the signal, $s_j(n)$. This captured signal can be removed from the current received data block, $x^i(n)$ by using a convolution operation between the channel estimate, $h_{est}(n)$ and $y_i(n)$. Thus the contribution of $s_j(n)$ within the received signal block can be computed and cancelled. Note that the remaining portion of the received signal is used as the input signal to the next stage of equalization. The cancellation process described can be expressed compactly as:

$$x^{i+1}(n) = x^i(n) - h_{est}(n) * y_i(n) \quad (14)$$

where we define $x_i(n)$ to be the modified received signal for stage i, $y_i$ is the equalized output at stage i, and $$h_{est}(n) = \begin{bmatrix} h_{1j} \\ h_{2j} \\ \vdots \\ h_{7j} \end{bmatrix}$$

is the channel estimate at this stage, which corresponds to captures signal, $s_j(n)$. The update (14) can be done using an FFT as:

$$x^{i+1}(n) = x^i(n) - iFFT(FFT(h_{est}(n))FFT(y_i(n))) \quad (15)$$

Note that at the first stage, $x^1(n)$ is defined to be the original received signal block.

Next, for the exemplary case of the 3-input/7-output MIMO system described above, after completing the equalization of all three signals, we may use the MIMO matrix operator $\aleph$ from (3), to write $$\begin{bmatrix} y_1 \\ y_2 \\ y_3 \end{bmatrix} = \begin{bmatrix} w_{11} & w_{12} & \ldots & w_{17} \\ w_{21} & w_{22} & \ldots & w_{27} \\ w_{31} & w_{32} & \ldots & w_{37} \end{bmatrix} \aleph \begin{bmatrix} x_1 \\ x_2 \\ \vdots \\ x_7 \end{bmatrix} \quad (16)$$

where each of the (bold) signals $x_j \in \mathbb{C}^N$, $y_i \in \mathbb{C}^N$, and $w_{ij} \in \mathbb{C}^L$ consist of multiple taps, similar to (4), and the tensor matrix W is the MIMO equalizer. Note that $x_j$ is the received 16-QAM signal block of length N, and each $w_{ij}$ (for stage i) is an equalizer filter of length L taps. At each stage of equalization, the MISO equalizer produces one row of the tensor matrix, W.

Consider one stage of the equalization process. Since a single equalized signal block, $y_i$ will result at any stage i of the equalization process (where 1≤i≤3), the equalizer output is given by (2). For block processing, (2) is implemented in Toeplitz form as follows. Let P (=7) be the number of receive antennas, and using the extended Toeplitz matrix formed by stacking the Toeplitz matrices for each received signal, which was previously specified as $$[XX] = [XX_1 \, XX_2 \ldots XX_7] \in \mathbb{C}^{(L+N-1) \times 7L} \quad (17)$$

So (2) becomes $$\underline{y_i} = \Sigma_{j=1}^{7} XX_j w_{ij}$$

or alternatively $$\underline{y_i} = [XX_1 \, XX_2 \, \ldots \, \ldots \, XX_7] \begin{bmatrix} w_{i1} \\ w_{i2} \\ \vdots \\ w_{i7} \end{bmatrix} \quad (18)$$

where each matrix, $XX_j$ is made up from elements of the (modified) received signal, $x_j$ from antenna j in the form of the Toeplitz matrix XX defined above. So using the extended Toeplitz of (17) for the MISO equalizer, the output in (18) can be written as $$\underline{y_i} = [XX]\underline{w_i}$$

Note that since Toeplitz multiplication has an equivalent convolution expression, (18) can alternatively be rewritten using Fourier transforms as $$\underline{y_i} = iFFT\Sigma_{j=1}^{7}\{FFT(w_{ij})FFT(x_j)\} \quad (19)$$

In (11), the form of the gradient of CMA cost function was specified when using block processing, with the entire received data block being processed in a single iteration. Now by specifying the matrix $(XX)^H \in \mathbb{C}^{PL \times (L+N-1)}$ to be the Hermitian of the Toeplitz matrix in (17) for the MISO equalizer, and by defining the error vector $$e(n) = E\{4(|y(n)|^2 - R_2)y(n)\} \in \mathbb{C}^N \quad (20)$$

then for MIMO case (11) becomes $$\nabla J_{CMA}(y) = \begin{bmatrix} XX_1^H e(n) \\ XX_2^H e(n) \\ \vdots \\ \vdots \\ XX_p^H e(n) \end{bmatrix} = \begin{bmatrix} x_1^*(n)*e(n) \\ x_2^*(n)*e(n) \\ \vdots \\ \vdots \\ x_p^*(n)*e(n) \end{bmatrix} \quad (21)$$

Then by taking Fourier transforms we can write:

$$\nabla J_{CMA}(y) = iFFT\left\{ \begin{bmatrix} FFT(x_1^*(n)) \\ FFT(x_2^*(n)) \\ \vdots \\ \vdots \\ FFT(x_p^*(n)) \end{bmatrix} FFT(e(n)) \right\} \quad (22)$$

where FFT is the Fast Fourier Transform (FFT) and iFFT is the inverse FFT. Similarly, the gradient of AMA has been specified in (12). Define the error vector $$d(n) = E\left\{ \sum_{i=1}^{M} \frac{1}{\sigma_{AMA}^2} e^{-\frac{|y(n)-c(i)|^2}{2\sigma_{AMA}^2}} (y(n)-c(i)) \right\} \in \mathbb{C}^N \quad (23)$$

Then based on a similar derivation to the CMA case above, the gradient of the AMA cost function for the MIMO system can be written using a convolution in a form analogous to (21) as:

$$\nabla J_{AMA}(y) = \{x^*(n)*d(n)\}$$

and by taking Fourier transforms we obtain a similar form to (22), $$\nabla J_{AMA}(y) = iFFT\left\{ \begin{bmatrix} FFT(x_1^*(n)) \\ FFT(x_2^*(n)) \\ \vdots \\ \vdots \\ FFT(x_p^*(n)) \end{bmatrix} FFT(d(n)) \right\} \quad (24)$$

Thus, the gradient of the CMA+AMA cost function is given by (10), which can be written as:

$$\nabla J(y) = iFFT\left\{ \begin{bmatrix} FFT(x_1^*(n)) \\ FFT(x_2^*(n)) \\ \vdots \\ \vdots \\ FFT(x_p^*(n)) \end{bmatrix} [FFT(e(n)) + FFT(d(n))] \right\} \quad (25)$$

where e(n) is given by (20), and d(n) is given by (23). The equalizer weights are updated using (9). Note that only the error vectors are recomputed at each iteration, when using (19) to find the new output $y_i$, since the (modified) received data vector is fixed for each stage.

Figure 4:
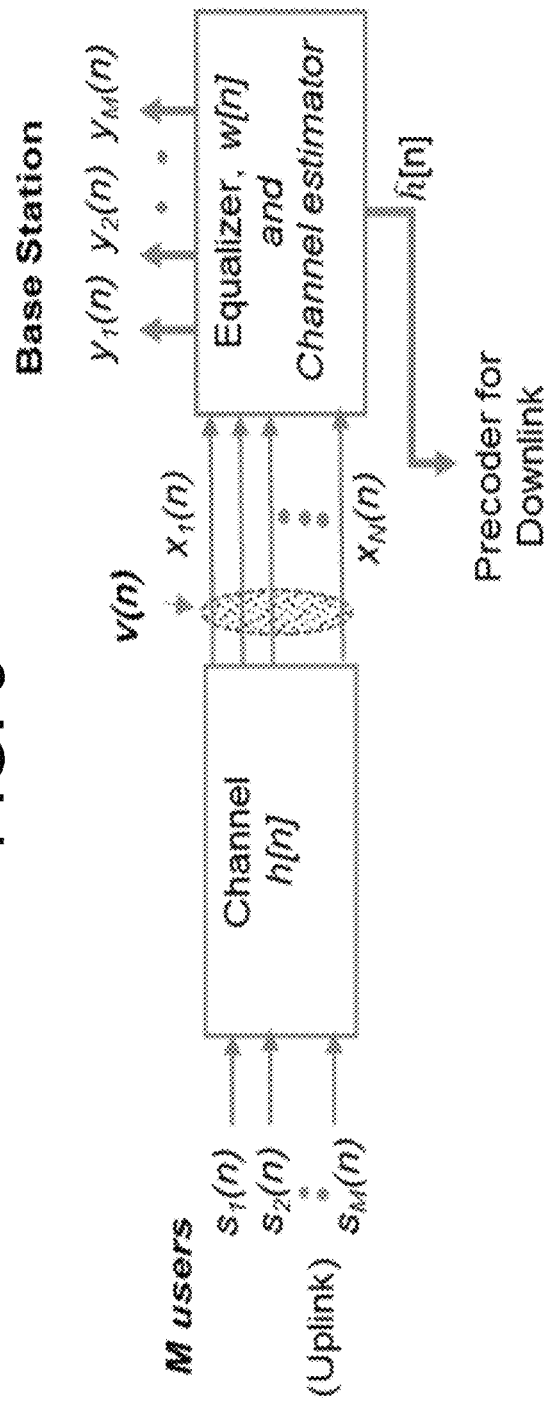
FIG. 4 is a schematic view of a MIMO equalizer system in accordance with further aspects of an embodiment of the invention.

Next, and in accordance with further aspects of an embodiment of the invention, FIG. 4 provides a schematic view of this MISO equalizer system, depicting a multiple access scheme for M-users communicating with an N-antenna array system at the base station. This is modeled here as an M-input/N-output communication system in which the equalizer and channel estimator generates a precoding matrix for the downlink communication after the equalizer and channel estimation processes have been carried out. Consider a multipath channel with K taps, and let L (>K) be the number of taps used in the equalizer, $\tilde{\omega} \in \mathbb{C}^L$. The equalizer weights are initialized by center-tap initialization, and the weights are then updated using the steepest descent, until convergence to minimize the CMA+AMA cost function. Thus the equalizer weight update is computed as previously specified in (9)-(12) above, for transmitted signal blocks of length, N and for data blocks, $\underline{x}$(n) received at the Base station.

With the advent of much faster processors and use of smart signal processing, this blind adaptive block algorithm can be implemented in real-time, using the FFT computations. For this multi-user case, the multi-stage multiple-input single-output (MISO) equalizer is used to separate out the transmitted signal blocks for each user, with the aid of a signal canceler and the computed estimate of the channel as described previoulsy.

After convergence of the equalizer, and having captured the transmitted signal from some user i, the corresponding channel estimate can be found by using (13).

For the exemplary case of a Uniform Linear Array (ULA) with antenna elements equally spaced along a straight line, there exists the property similar to that obtainable in radar systems, to accept electromagnetic waves arriving in the form of a plane wave from a particular direction, while discriminating against signals from other directions. Based on the Nyquist criterion, the optimal spacing between each array element must be less than or equal to half the wavelength. Beam steering is achieved by varying the phase of each signal component across the array elements.

For a single user, consider a MIMO system with a N-element uniform linear array, and steering vector a(θ) as defined above in the Summary of the Invention. As viewed from the base station receiver for the uplink communication, the K-tapped channel, h(t) is usually approximated by the column vector $$h(t) = \sum_{l=1}^{K} \alpha_l \cdot e^{j \cdot 2\pi v_l t} a_R(\theta_l) \in \mathbb{C}^{N \times 1} \quad (26)$$

where $a_R(\theta_l)$ is the steering vector at the receiver as a function of angular direction or electrical angle $\theta_l$ of the arriving plane waves for each path l, where $1 \leq l \leq K$; $\alpha_l$ is the complex gain of the channel; and $v_l$ is the measure of the Doppler shift in the case of a mobile user. Note that since we do not include mobility in these experiments, $v_l = 0$.

For a multiuser scenario where each user is equipped with a single antenna, we simulate this environment by randomly generating the angle of incidence of the line-of-sight (LOS) path of the mm-wave signal beam, l=1, to the base station for user m, using a uniform distribution to pick a physical angle $\theta_1'$ between −60 and 60 degrees, i.e. $-\pi/3 \leq \theta_l' \leq \pi/3$. For each user i, the relationship between physical angles and electrical angles, and the steering vectors a(θ) are as defined above in the Summary of the Invention.

Thus consider the multiuser scenario with M users, each transmitting a signal block, $\underline{s}i \in \mathbb{C}^{N_0 \times 1}$ of size $N_0$, (for $1 \leq i \leq M$) over a (single-tap) LOS only channel to a base station, equipped with a ULA with N antenna elements (for N>>M in the case of massive MIMO). The received signal at the base station, $\underline{x}j \in \mathbb{C}^{N_0 \times 1}$ is given by $\underline{x} = H\underline{s}$, or more fully as $$\begin{bmatrix} \underline{x}_1^T \\ \underline{x}_2^T \\ \underline{x}_3^T \\ \vdots \\ \vdots \\ \underline{x}_N^T \end{bmatrix} = \begin{bmatrix} | & | & \cdots & | \\ \underline{h}_1 & \underline{h}_2 & \cdots & \underline{h}_M \\ | & | & \cdots & | \end{bmatrix} \begin{bmatrix} \underline{s}_1^T \\ \underline{s}_2^T \\ \vdots \\ \underline{s}_M^T \end{bmatrix} \quad (27)$$

where $\underline{h}_i \in \mathbb{C}^N$ is the vector of channel components from user i to the N-element ULA, which is located at the base station. Note that $$H = \begin{bmatrix} | & | & \cdots & | \\ \underline{h}_1 & \underline{h}_2 & \cdots & \underline{h}_M \\ | & | & \cdots & | \end{bmatrix} \in \mathbb{C}^{N \times M} \quad (28)$$

where for a (single-tap) LOS only channel $$\underline{h}_i = \begin{bmatrix} h_{i1} \\ h_{i2} \\ h_{i3} \\ \vdots \\ h_{iN} \end{bmatrix} \triangleq \alpha_i \begin{bmatrix} 1 \\ e^{-j\theta_i} \\ e^{-j2\theta_i} \\ \vdots \\ e^{-j(N-1)\theta_i} \end{bmatrix} = \alpha_i \underline{a}(\theta_i) \quad (29)$$

For a channel with LOS plus three other paths (i.e., K=4 taps) and with no mobility, each channel vector is specified as $$\underline{h}_i = \sum_{l=1}^{K} \alpha_{il} \cdot \underline{a}(\theta_{il}) \quad (30)$$

$$= \begin{bmatrix} | & | & \cdots & | \\ \underline{a}(\theta_{i1}) & \underline{a}(\theta_{i2}) & \cdots & \underline{a}(\theta_{iK}) \\ | & | & \cdots & | \end{bmatrix} \begin{bmatrix} \alpha_{i1} \\ \alpha_{i2} \\ \vdots \\ \alpha_{iK} \end{bmatrix}$$

Note that for a channel with LOS only, K=1 such that (30) reduces to (29).

EXAMPLES

From simulations conducted applying the forestated methods, we consider uplink communications for a massive MIMO wireless system, transmitting from M users, each of which is equipped with a single antenna, to a base station which is equipped with a uniform linear array antenna system. First we have considered a single-antenna single-user scenario, and then considered the case of three (multiple) users each using a single antenna communicating first over a channel with LOS only (i.e., K=1), and then over a multipath channel with four taps. In the case of multipath, the channel paths from each user i to the base station are generated as specified by (30). Note that the LOS electrical angle is generated by a uniform distribution over the range $-\pi/3 \leq \theta_i' \leq \pi/3$, and the other multipath electrical angles, $\theta_j$, for l>1 are generated using a Laplacian distribution with a mean given by the LOS angle and a standard deviation of 0.5.

The complex-valued gains $a_i$, for $1 \leq i \leq 4$, are generated using a circularly symmetric complex-valued Gaussian distribution with a variance given by the power delay profile (pdp) for the different paths. This power delay profile is generated by using a uniform distribution over the range [−10, −5] dB for the non-LOS paths and 0 dB (or unit variance) for the LOS path.

Figure 5:
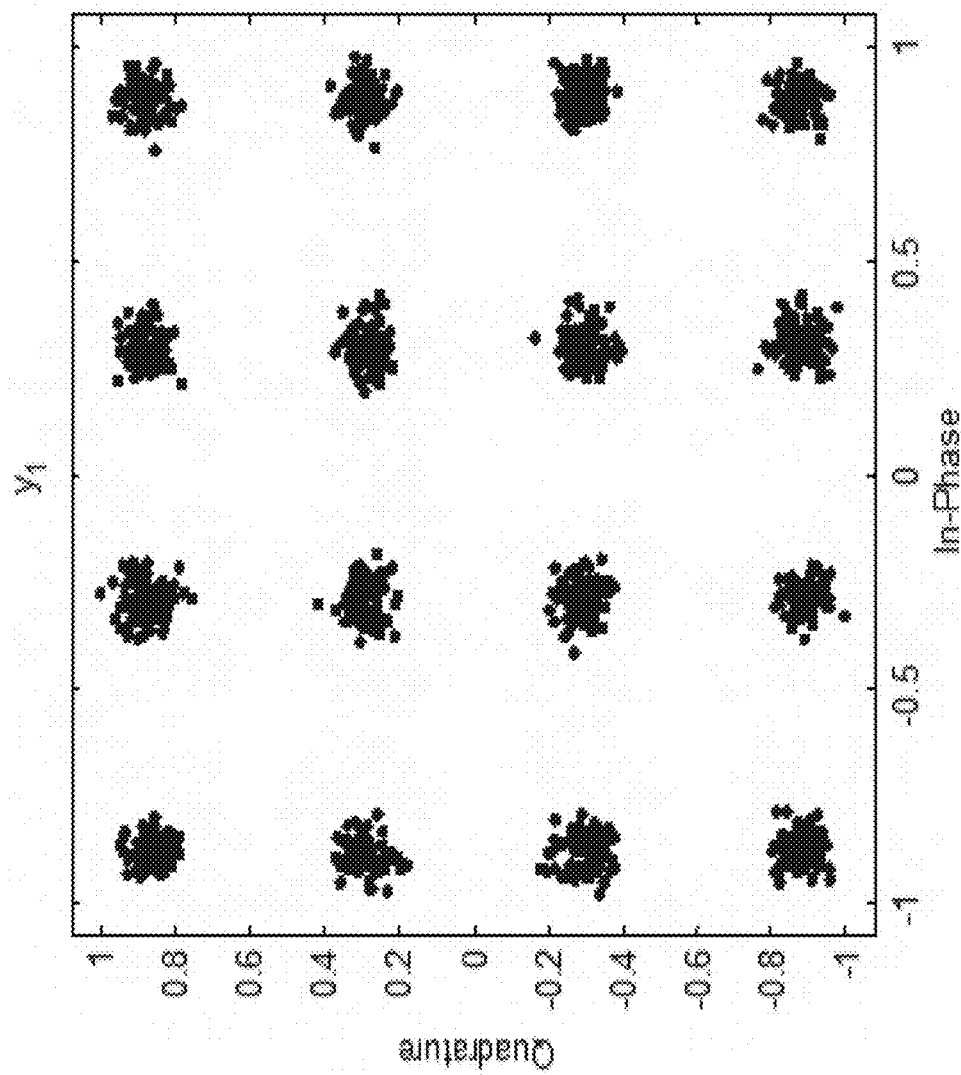
FIG. 5 is a graphical representation of the recovered equalized 16-QAM signal output constellation at the receiver after convergence of the CMA+AMA equalizer for the single user case.

FIG. 5 shows the recovered equalized 16-QAM signal output constellation at the receiver after convergence of the CMA+AMA equalizer for the single user case. In this case, a single user is transmitting signal blocks modulated using 16-QAM to a base station equipped with a ULA with 20 antennas over a multipath channel, with K=4 channel taps, at SNR of 30 dB.

The resulting symbol error rate (SER) is zero in this case, with a computed mean square error 8.09e-04.

Figure 6:
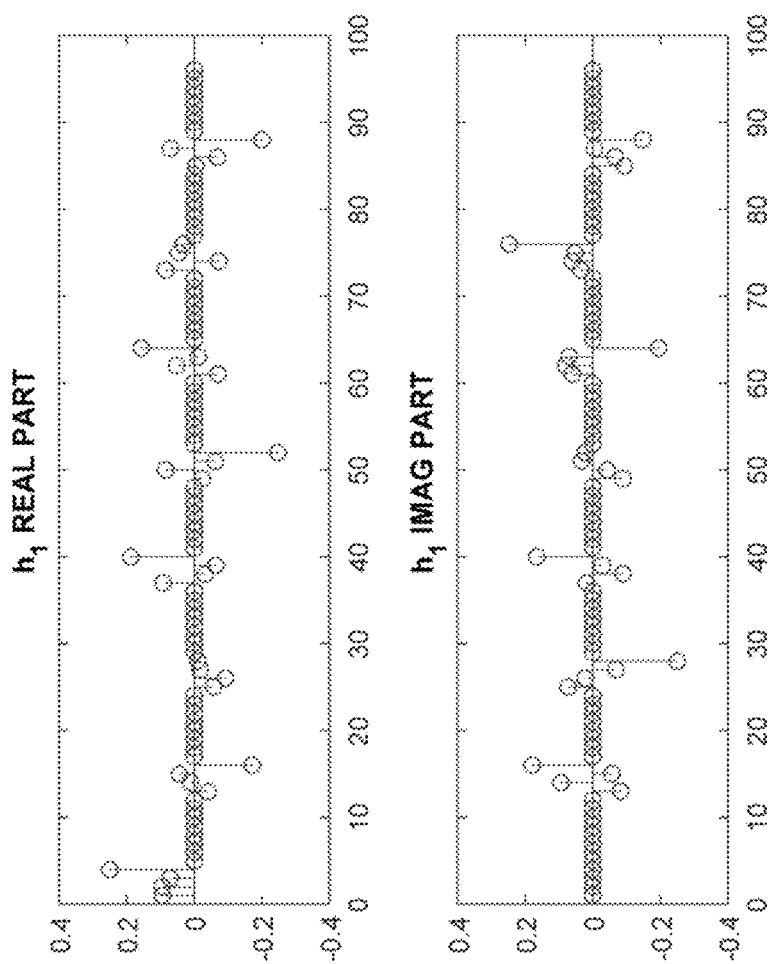
FIG. 6 is a graphical representation of the simulated 4-tap channel used for 16-QAM transmission from the single user to the 20 element ULA antenna at the base station.
Figure 7:
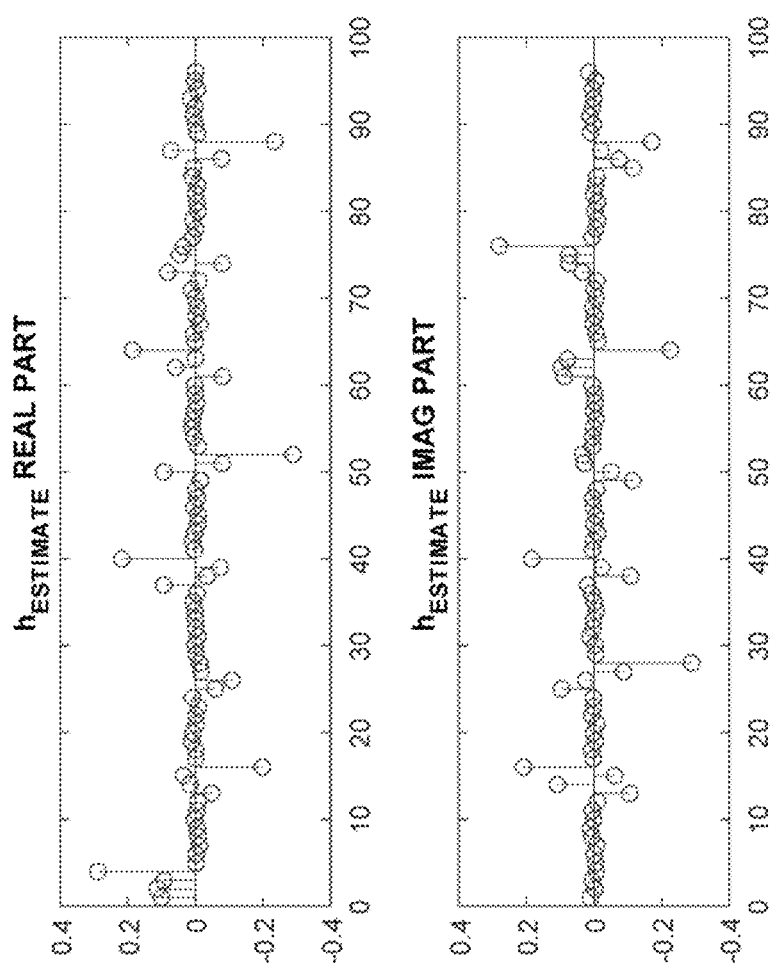
FIG. 7 is a graphical representation of the estimate of the simulated channel of FIG. 6 at the beamformer.

FIG. 6 and FIG. 7 show results for the simulated 4-tap channel used for 16-QAM transmission from the single user to the 20 element ULA antenna at the base station. The incident physical angle of arrival at the ULA is θ=1.0472 radians (60 degrees). The actual simulated channel is shown in FIG. 6, while the channel estimated at the base station by using (30) is shown in FIG. 7.

When evaluating the performance of this system for variable numbers of base station antennas, there is a need to vary the step-size constant, β and also the maximum number of iterations with the number of output antennas, as shown in Table 1.

TABLE 1

Parameters for varying number of base station antennas

| Output Antennas | Step-size Constant, β | Maximum number of Iternations |
|---|---|---|
| 20 | 0.03 | 600 |
| 40 | 0.01 | 600 |
| 60 | 0.008 | 400 |
| 80 | 0.006 | 900 |
| 100 | 0.004 | 900 |

We compute the error rates, and percentage of Monte Carlo runs which successfully recover all the transmitted user signals, for both a single user and the three (multi)-user scenarios using 800 Monte Carlo runs. The results show the the SER of the recovered signal is higher for the first user signal recovered, and this SER generally decreases at subsequent stages, except at 30 dB. It was also noted that the mean square error (MSE) is lowest for the first stage of signal recovery, and is higher at subsequent stages.

The channel estimation was evaluated by computing the channel errors over varying SNRs and varying number of base station antennas. We note that the channel error rates reduced slightly with higher SNRs, but remained fairly constant between 1e-4 and 1e-5. Over varying numbers of base station antennas, the channel error reduces with increasing number of antenna at the base station.

The percentage of working cases out of 800 Monte Carlo runs was examined over varying SNR and varying numbers of antenna at the base stations at 30 dB. The cumulative percentage of equalized cases was considered at each successive stage of the signal recovery, i.e., for each user in the multi-user scenario. It was observed that the signal recovery rate is close to 100% for all three users at an SNR of 10 dB and above, and is consistent at around 100% for increasing numbers of antenna at the base station.

Spectral efficiency can be determined as an expected value of the maximum channel capacity, C, over 800 Monte Carlo runs, i.e.

$$C = \max_{Q:Tr(Q)=P} C(Q)$$

where $$C(Q) = E_f\left[\log\left|I_N + \frac{SNR}{M}HQH^H\right|\right]$$

for a transmitted signal s, with covariance matrix Q, given by $Q=E[ss^H]$.

Note that the channel matrix H is generated using an i.i.d. complex Gaussian distribution, so the ergodic capacity maximizes the entropy for a given covariance matrix. Since we are considering the maximum of the trace of Q and generating unit power at each transmit antenna, the above channel capacity formula reduces to $$C = E_H\left[\log\left|I_N + \frac{SNR}{M}HH^H\right|\right]$$

For the multi-path case, a single virtual channel coefficient is used in place of each set of dependent paths. Thus, capacity is computed as follows:

$$C = E_v\left[\log\left|I_N + \frac{SNR}{M}H_v H_v^H\right|\right]$$

where K is the number of paths and the virtual channel is given by $$H_v(m,n) = \sum_{l=1}^{K} H_{m,n,l}$$

for $1 \leq m \leq M$; $1 \leq n \leq N$.

Since we are transmitting signals based on unit power for each user over a normalized channel, the channel capacity can be estimated based on the number of users and the SNR value. Note that each non-LOS path is attenuated from the LOS path by a factor of 0.32 to 0.56, as previously specified in our simulation parameters.

Maximum Spectral Efficiency=

$$C_{max} = \max\left[\log\left|I_N + \frac{SNR}{M}HH^H\right|\right]$$

The above equation is at first computed for the LOS multipath channel whose normalized value is 1 for each number of channel output, and then added to a maximum fraction of itself as specified by the power delay profile for each non LOS multi-path instance.

Based on the foregoing, an adaptive blind algorithm can be used for millimeter-wave channel estimation and precoding in a massive MIMO multi-user communications scenario. The channel state information acquired at the equalization and channel estimation stage can be used to perform beamforming in the downlink communication. While massive MIMO is beneficial at centimeter-wave frequencies, it is essential in the millimeter-wave bands, because the high free-space path loss at these frequencies necessitates large array gains to obtain sufficient signal-to-noise ratio (SNR), even at moderate cellular distances of about 100 m. A hybrid transceiver algorithm as detailed above can achieve a suitable hybrid beamforming for mm-wave communication with time-domain scheduling and can also be tested in a channel model platform as described herein.

Interference cancellation design based on statistical channel state information (CSI) may further enable inter-cell interference, as could coordination in the heterogeneous network. Cancellation schemes may incorporate reversed time division duplexing (TDD) protocol, spatial blanking, and instantaneous transmission rate. As the number of antennas increase, channel hardening will also be more evident, and the effect caused by the fluctuations of channels will decrease.

The models may also incorporate channel links which include internet-of-things (IoT) devices or sensor networks, and these may be operating in either an indoor or outdoor environment.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A method for processing wireless signals received from multiple users at an antenna array, comprising the steps of:
   providing a base station equipped with a phased array antenna system;
   receiving at said phased array antenna system a plurality of wireless uplink transmissions in a millimeter frequency band of 30 GHz-300 GHz, each said wireless uplink transmission being received through a distinct wireless communications channel from a distinct wireless transmitter;
   applying adaptive, block processing blind channel equalization to generate channel state information by providing an estimate of a channel path for each one of said wireless communications channels, and to separate out and recover individual wireless uplink transmissions from said plurality of wireless uplink transmissions; and
   generating a zero-forcing precoding matrix to beamform a downlink signal toward a transmitter of one of said wireless uplink transmissions through a corresponding channel between said transmitter and said base station based on said estimated channel state information of said corresponding channel.

2. The method of claim 1, wherein said phased array antenna system further comprises a uniform linear array antenna system.

3. The method of claim 1, wherein said phased array antenna system further comprises a plurality of millimeter wave antennas.

4. The method of claim 3, wherein said plurality of millimeter wave antennas further comprises a massive multiple-input/multiple output ("MIMO") antenna system comprised of at least 100 antenna elements.

5. The method of claim 1, further comprising the step of applying at least one of BPSK and QPSK modulation to said plurality of wireless uplink transmissions.

6. The method of claim 1, wherein said wireless uplink transmissions are in a frequency band of 92 GHz-95 GHz.

7. The method of claim 1, wherein said adaptive, block processing blind channel equalization is applied in real time.

8. The method of claim 1, wherein said step of applying adaptive, block processing blind channel equalization further comprises using a multi-stage multiple-input/single-output ("MISO") equalizer to separate out and recover transmitted signals at each stage from the received data mixture.

9. The method of claim 8, further comprising the step of using a signal canceler based on a computed estimate of the channel.

10. The method of claim 8, further comprising the step of:
after achieving a convergence of the equalizer, creating a channel path estimate comprising channel state information of a corresponding channel for each of said distinct wireless communications channels.

11. The method of claim 10, further comprising the step of using a multi-stage, iterative process to sequentially separate each of said distinct wireless communications channels.

12. The method of claim 11, further comprising repeating said iterative process through a number of stages equal to a total number of wireless uplink transmissions in said plurality of wireless transmissions.

13. The method of claim 11, further comprising the step of producing as output a strongest signal present in the received data mixture.

14. The method of claim 8, wherein processing of said transmitted signals is carried out using FFT processing.

15. The method of claim 8, wherein processing of said transmitted signals is carried out using a time-division processing operation.

16. The method of claim 8, wherein processing of said transmitted signals is carried out in the frequency domain.

17. A system for processing wireless signals received from multiple users at an antenna array, comprising:
a base station equipped with a phased array antenna system, one or more processors, and one or more memories coupled to said one or more processors, wherein the one or more memories are configured to provide the one or more processors with instructions which when executed cause the one or more processors to:
receive at said phased array antenna system a plurality of wireless uplink transmissions in a millimeter frequency band of 30 GHz-300 GHz, each said wireless uplink transmission being received through a distinct wireless communications channel from a distinct wireless transmitter;
apply adaptive, block processing blind channel equalization to generate channel state information by providing an estimate of a channel path for each one of said wireless communications channels, and to separate out and recover individual wireless uplink transmissions from said plurality of wireless uplink transmissions; and
generate a zero-forcing precoding matrix to beamform a downlink signal toward a transmitter of one of said wireless uplink transmissions through a corresponding channel between said transmitter and said base station based on said estimated channel state information of said corresponding channel.

18. The system of claim 17, wherein said instructions configured to apply adaptive, block processing blind channel equalization further comprises instructions configured to use a multi-stage multiple-input/single-output ("MISO") equalizer to separate out and recover transmitted signals at each stage from the received data mixture.

19. The system of claim 18, wherein said instructions are further configured to:
after achieving a convergence of the equalizer, create a channel path estimate comprising channel state information of a corresponding channel for each of said distinct wireless communications channels.

20. The system of claim 19, wherein said instructions are further configured to use a multi-stage, iterative process to sequentially separate each of said distinct wireless communications channels, and to repeat said iterative process through a number of stages equal to a total number of wireless uplink transmissions in said plurality of wireless transmissions.

* * * * *